United States Patent
Vallarino et al.

(10) Patent No.: US 8,907,504 B2
(45) Date of Patent: Dec. 9, 2014

(54) MOLECULAR MILL METHOD AND APPARATUS FOR ITS USE

(75) Inventors: Martin Vallarino, Montevideo (UY); Sandra Pose, Montevideo (UY)

(73) Assignee: SAMAYS Innovaciones Srl (UY)

( * ) Notice: Subject to any disclaimer, the term of this patent is extended or adjusted under 35 U.S.C. 154(b) by 277 days.

(21) Appl. No.: 13/324,227

(22) Filed: Dec. 13, 2011

(65) Prior Publication Data
US 2012/0146456 A1 Jun. 14, 2012

Related U.S. Application Data

(60) Provisional application No. 61/422,865, filed on Dec. 14, 2010.

(51) Int. Cl.
| | | |
|---|---|---|
| F02B 63/04 | (2006.01) | |
| F03G 7/08 | (2006.01) | |
| H02K 7/18 | (2006.01) | |
| H02N 3/00 | (2006.01) | |

(52) U.S. Cl.
CPC .................................. *H02N 3/00* (2013.01)
USPC ....................................................... 290/1 R

(58) Field of Classification Search
CPC ....................................................... F02N 3/00
USPC ....................................................... 290/1 R
See application file for complete search history.

(56) References Cited

U.S. PATENT DOCUMENTS

| | | | |
|---|---|---|---|
| 4,146,800 A | 3/1979 | Gregory et al. | |
| 4,206,396 A | 6/1980 | Marks | |
| 4,494,009 A | 1/1985 | Yukl | |
| 8,421,047 B2 * | 4/2013 | Carmein et al. | 250/573 |
| 8,502,507 B1 * | 8/2013 | White et al. | 322/2 A |

OTHER PUBLICATIONS

Bian et al. "Negative Corona Inception Voltages in Rod-plane Gaps at Various Air Pressures and Humidities." *IEEE Transactions on Dielectrics and Electrical Insulations*. vol. 18. No. 2. Apr. 2011. pp. 613-619.

De Mey et al. "Characteristics of Electro-Gas-Dynamic Wind Energy Devices." *Energy Conv. & Mgmt* vol. 20. 1980. pp. 201-203.

Grosu et al. "On Modeling of Processes of Moisture Circulation and Electric Charge Separation in the Atmosphere." *Surface Engineering & Applied Electrochemistry*. vol. 43. No. 3. 2007. pp. 176-181.

MacAlpine et al. "The Effect of Humidity on the Charge/Phase-Angle Patterns of ac Corona Pulses in Air." *IEEE*. vol. 10. No. 3. 2003. pp. 506-513.

Messaoudi et al. "Influence of Humidity on Current Waveform and Light Emission of a Low-frequency discharge controlled by a Dielectric Barrier." *IEEE*. vol. 3. No. 4. 1996. pp. 537-543.

Mohnen. "Discussion of the Formation of Major Positive and Negative Ions up to 50 km Level." *Pure & Applied Geophysics*. vol. 84. 1971. pp. 141-153.

* cited by examiner

*Primary Examiner* — Javaid Nasri
(74) *Attorney, Agent, or Firm* — Merchant & Gould P.C.

(57) ABSTRACT

The invention relates to electric energy generation from wind energy in a much more efficient way than current ones. This is done by means of passing the air or other humidity holding gas through an electric field which must be below the dielectric rupture limit of the gas. There must be no great divergence of electric field lines. The free electrons contained in the gas, of greater mobility than the ions, are attached to the greater mass water molecules, which will diminish their mobility and their detachment from negative ions which are at the center of clusters. Thus, the wind will tend to move the charges in the same sense and direction as the mass of the gas, resulting in an increase of electric potential across the field. The method allows collecting the charges and allows the increase in the electric potential to be available for its utilization.

12 Claims, 4 Drawing Sheets

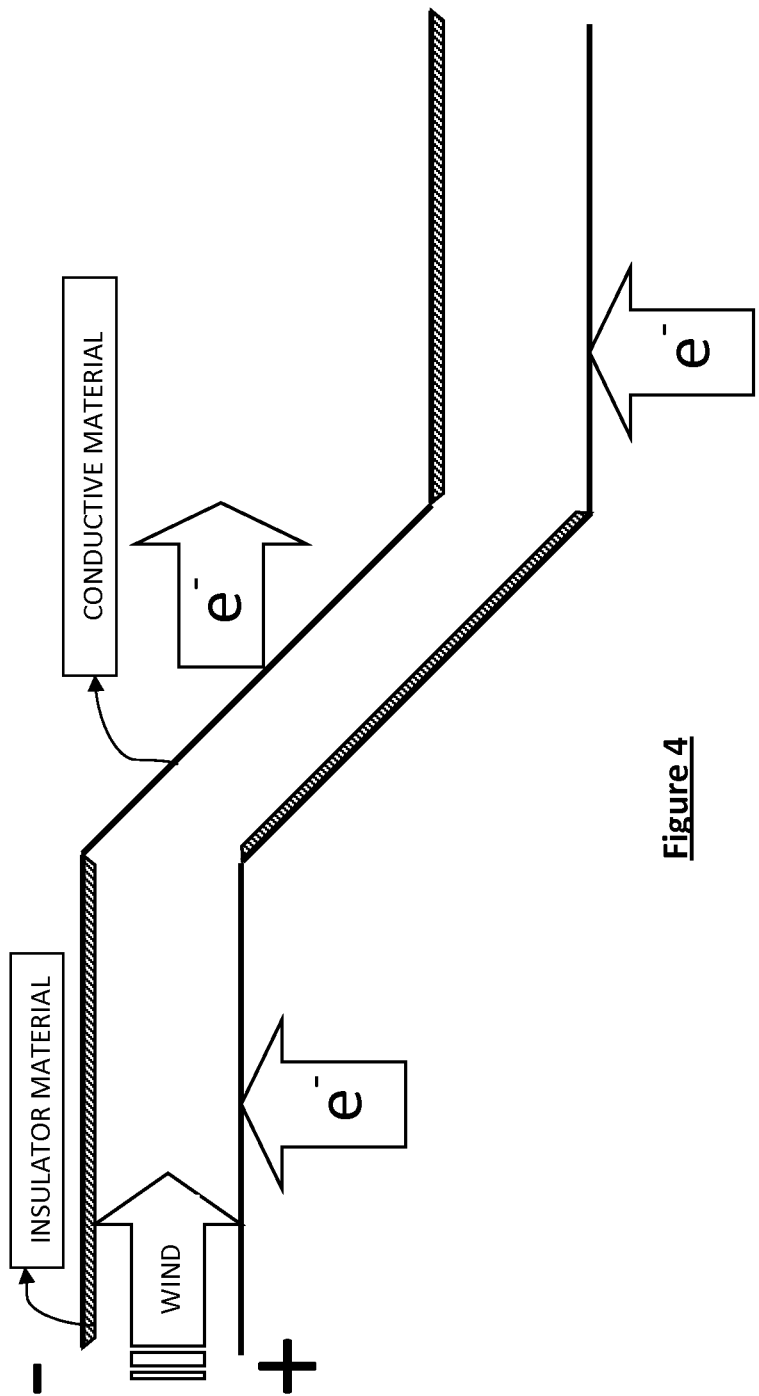

MOLECULAR MILL METHOD AND APPARATUS FOR ITS USE

This application claims benefit of U.S. patent application Ser. No. 61/422,865, filed 14 Dec. 2010 and which application is incorporated herein by reference. To the extent appropriate, a claim of priority is made to the above disclosed application.

BACKGROUND

The invention pertains to the field of ions transported by the wind or gas generators and in particular to the use of humidity in order to transport charges.

U.S. Pat. No. 4,206,396 (1980), published by A. M. Marks, describes an electric generator without moving parts and with a mechanism that introduces water particles through a charged electrode. This patent states that assuming a wind velocity of 10 m/s (36 km/h) the wind power converted to electric power is 0.45 kW/m$^2$ at 100,000 Volts DC. Even though the method and the apparatus we describe requires the implementation of a system of much simpler construction than the ones of this patent, in the same conditions and with the same ambient humidity of 9 gr/Kg it generates an electric power of 1 kW/m$^2$.

U.S. Pat. No. 4,146,800 (1979), published by S. E. Gregory and A. K. Schuring, refers to an apparatus and method for generating electric energy from wind, having the characteristic of ionizing the air in a specific zone which it calls ionizing or injector section. Also in this case, even though the method we invented requires the implementation of simpler constructive systems, and while this patent mentions that a yield of 44.59 W/m$^2$ (5 mph, or 8.1 km/h approx) may be obtained, in the method we describe the efficiency a much higher yield of approx. 230 W/m$^2$ is obtained at 100,000 Volts and 9 gr/Kg of ambient humidity is generated.

What was published by F. P. Grosu, M. K. Bologa, A. A. Polikarpov, and O. V. Motorin, "On Modeling of Processes of Moisture Circulation and Electric Charge Separation in the Atmosphere", Surface Engineering and Applied Electrochemistry, Vol. 43, No. 3, pp. 176 181 (2007), refers to a laboratory implemented model of the processes which are produced in the atmosphere. In said model there is a solar vapor collector (SVC) in order to collect water that will be used later in the generation process. Water enters the generation system as an aerosol. In order to compare we shall only consider the generation part of said model, without considering the model's SCV, nor any other part of that system (which have a considerably bigger size that the generator) and under these conditions, where it's generator consists of two 10×10 cm cylinders this system obtains for 15,000 Volts, 1 µA, that is 9.55 µw/cm$^3$. With the method described in our invention, with a 5 km/h wind and air with a humidity of 9 gr/Kg, an approximate electric power of 18 µw/cm$^3$ is obtained. On top of this much higher generation (almost 100% higher) we emphasize the constructive simplicity and the considerably smaller dimensions of our invention. And, we stress, both processes are conceptually unrelated.

U.S. Pat. No. 4,494,009 (1985), published by T. Yulk, refers to a method and a device for generating electric energy moving air. Same captures earth-air static electrical potential which is produced by a mass of air moving over a stationary airfoil, and it uses the air as a charge transporter. In said method, with a wind of 7 mph (11.26 km/h), the equivalent of 18.6 W/m$^2$ is produced; while in the method that is herewith described, when functioning at 100,000 Volts and assuming a specific humidity of 9 gr/Kg, an electric power of approximately 324 W/m$^2$ is obtained. This is to say that the method that we describe, even when requires a simpler construction device, obtains very much higher yields.

Without detracting from the inventions described above, it is obvious that either alone of combined they do not nearly describe the invention herewith claimed, nor do they obtain even similar yields to our invention.

SUMMARY

The invention refers to an apparatus and a method for the generation of electric energy from wind energy. It results from laboratory experiments and research which at the beginning were alien to this topic, but given the unexpected discovery that they were generating electric energy in a substantial amount, we proceeded to the analysis of the experimental results. This led to several improvements and concluded in the development of the current invention. We must stress, therefore, that we did not start from a theoretical development, but from measuring the unexpected results of laboratory experiments which had finally concluded in the production of a prototype.

The invention consists in a way of generating electric energy starting with wind energy and which is more efficiently than current ones, and consisting in the passage of air or other gas that contains humidity (not restricted to ambient pressure and temperature) through an electric field which must be below the dielectric rupture threshold of the gas. There must be no great divergences in the electric field lines such as are produced, for example, near a charged tip.

The free electrons contained in the gas—of considerable greater mobility than the ions—, are attached to the much more massive water molecules [1] thus determining a substantial decrease in their mobility and their detachment from negative ions which are at the center of molecular clusters. The temperature should preferably be above the one at which condensation is produced in air or in the used gas, so that the molecular clusters may not be transformed in water droplets which would implicate an assortment of molecules much bigger than desirable, as the ones produced, for example, in spray [2] mentioned as part of previous art. This is in order to facilitate that the mass of gas may carry the molecule clusters containing the charges, in the same sense and direction than the wind moving the mass of gas (air or otherwise), since the mass of those clusters is closer to the surrounding molecules than to the mass of water droplets, which is much higher; this results in the increase of electric potential through the field. The method allows collecting the charges and allows the increase in the electric potential to be available for its utilization.

The air or other gas where humidity is found does not require to have received a contribution of charged particles from some process such as, for example, of seeding with charged and/or uncharged particles, smoke, aerosol vapor, etc., but this is no impediment for the implementation of the method and may in these cases even reach to the point of not requiring the use of humidity.

A great amount of humidity is not needed, and this is a fundamental addition to the invention since it does not require an external source of water, being that it may be sufficient with ambient humidity in order to use this proceeding even in zones which are considered arid.

The electric field in the process must be below the dielectric rupture limit of the gas (air or otherwise) which must be determined by the conditions in which said gas may be at the moment of use of said process, and by the contaminants that said gas may have at the moment of use (such as, for example, water, diverse charged and or uncharged particles, presence of other gases, etc.).

At the same time there must be no great divergence in the electric field lines, which is a fundamental difference with the Electro-Gas-Dynamic Wind Energy Devices, or Electro-Gas-Dynamic Generators (EGDG) [3], since these latter ones have a specific zone where the ionization of particles is produced and where the potential gradient is much more than in the rest of the system in order to be able to polarize as many particles as possible. The strong electric fields in the EGDG ionization zone determine the existence of a recombination rate which in the method that is here described tends to be low in the measure that there is no specifically ionizing electric field which is much superior to the conversion of mechanical into electric energy field. Also, in the EGDG, when a great quantity of charges of the same sign are produced in the ionization zone, the non polarized molecules may find it difficult to move in an intense electric field at that high concentration of charged particles as exists in such a zone. This increases the particles' mobility coefficient, which is the inverse of the friction coefficient of said particles. Since in the method described there is no specific ionization zone with great potential gradients, the charged particles are produced in the same field where the conversion of mechanical into electric energy is produced, given that there is no significant divergence in the electric field lines. This determines that the charged particles are created more uniformly in the system, and thus there is no such a significant concentration of charges in a specific zone (ionization zone) as is the case in EGDG.

At the same time, this determines that the mobility of the particles in this method does not increase as much as it does in the EGDG, making the transportation of charges in the EGDG not as efficient.

In the method and the apparatus described humidity is used to facilitate the transport of the charges. This is attained since the molecules tend to trap the free electrons accelerated by the electric field and form clusters with the negative ion at its centre [1] [4], thus also diminishing its mobility and decreasing the probability of negative charge loss in the collisions with other molecules, which happens for example with oxygen ions [5], which rapidly loses its charge upon collision with other molecules. Beside this, the clustering is attributed to negative or positive ion solvation by water i.e. the ions are surrounded by water molecules [4]. Due to all above there is a much lower probability of releasing their charges due to the elastic collisions with molecules, which determines—in the air or in the used gas—an increase in the exchange of charges with the bodies that are used to generate the electric field.

In current EGDGs, humidity is generally a problem and at the most drops of water are used in such devices' specific ionization zones, with the concomitant disadvantage regarding the mobility, as described above. At the same time, the drops of water differ from humidity in what is relative to their mass, which makes transportation by wind more difficult. Thus, the humidity required for the method allows for the transportation and interchange of charges, and may significantly improve the efficiency with respect to current methods with Electro Gas Dynamic Generator Devices.

The wind necessary for the invention we describe may be generated by Nature or artificially produced in any form, as product of sub product (desired or not) of some process and/or apparatus. Due to what has been described above, the wind will be able to efficiently transport both the positive and the negative charges, since it is more difficult for negative charges to liberate the electron by collision with other molecules, and because the friction with the remaining gas (air or otherwise) molecules is increased due to the fact that, on attaching electrons to much more massive water molecules, same results to be of similar mass as the rest of the molecules around, thus permitting an efficient wind transportation.

The building elements needed in order to construct the apparatus for the use of the method need not have mobile parts, apart from, for example, some additional instrumentation that may be added to the described apparatus, for example to improve the position of the apparatus to increase wind usage. Also, another great contribution of the described method is the simplicity of its constructive parts, since it would be enough, in order to instrument it, and just as an example, what is shown in FIG. 4, not requiring complex structures for its construction or maintenance.

At the same time the method was experimented at such low speeds as 1.4 meters/sec. (approx. 5 km/h), a condition at which current generation windmills generate nothing. Also, while traditional windmills generate approximately 300 W/m$^2$ at a wind velocity of 10 m/sec, the method we describe generates about 1000 W/m$^2$, under the same conditions and with an ambient Specific Humidity of 9 gr/Kg, but with much simpler construction requirements.

BRIEF DESCRIPTION OF THE DRAWINGS

FIG. 4 is a schematic diagram which illustrates a possible apparatus for the implementation of the described method. This figure does not include the constructive elements required for the separation of the plates among themselves.

DETAILED DESCRIPTION

Figure 1:
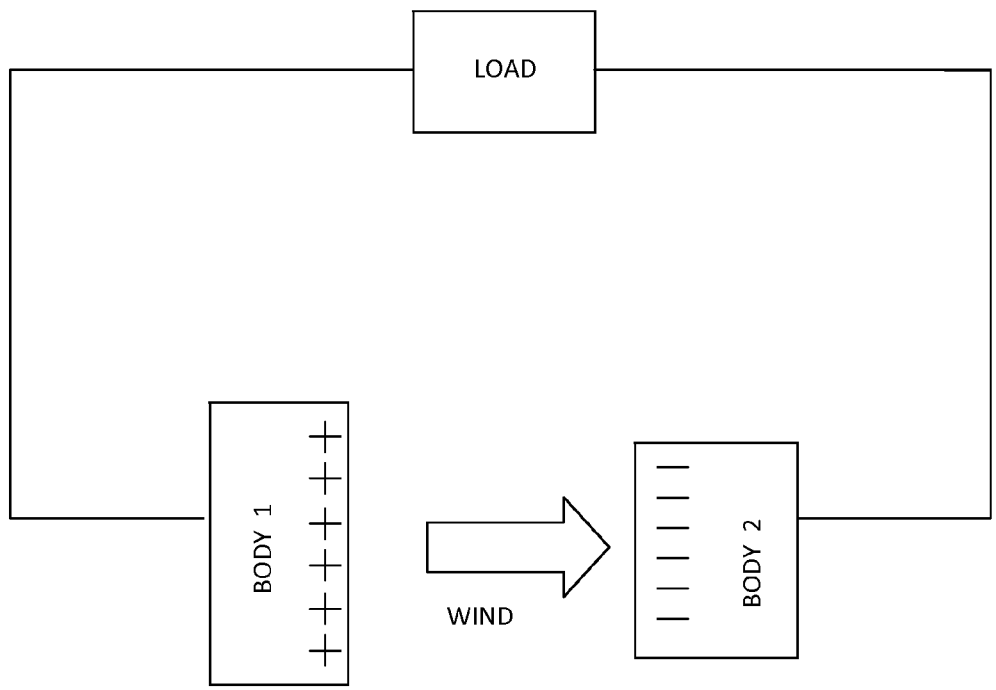
FIG. 1 is a schematic diagram which illustrates an embodiment of the described invention. The wind's direction and sense, as well as the polarity of the bodies which are shown, represent only a possibility among many.

The method starts by electrically loading two separate bodies with equal and opposed charges, thus creating an electric field between them. The electric field in the process must be under the dielectric rupture limit of the gas (air or otherwise) to be moved by the wind, and will be determined by the conditions in which this is found to be at the moment of use and by the contaminants that it may have either by a natural or artificial addition. This addition is not required, nor is it an impediment for the implementation of the process herewith described (for example, water, diverse charged or uncharged particles, presence of other gases, etc.). Also, there must not be considerable great divergence of electric field lines such as are produced, for example, near the end of a charged tip. Such bodies as seen in FIG. 1 are connected between themselves by means of a load to which the electric energy generated will be supplied. On the other hand wind is used in order to interchange charges between one body and the other, or between one body and the gas (air or otherwise). That is: the humidity containing gas (air or otherwise) is used as a means for the transportation of charges. The wind may be both generated by Nature and produced artificially, as product or by-product (sought for or not) of some process or apparatus. The free electrons contained in the gas—of considerable greater mobility than the ions—, are attached to the much more massive water molecules [1] thus determining a substantial decrease in their mobility and their detachment from negative ions which are at the center of molecular clusters. Humidity makes negative charges tend to acquire the wind's sense, direction and velocity in an easier way than if they were in a free electron state. In FIG. 1 the wind's direction and sense are described only as an example.

The water molecules contained in the gas (air or otherwise) have the property of attaching themselves with electrons or with ions and form clusters of water molecules containing the ion at its centre. This determines that from the moment of attachment on, the clusters, upon colliding with other molecules, will not as easily liberate their charge. On the other hand, the uptake by humidity of free electrons does not determine a decrease in the creation of charges [6]. Due to this, wind will tend to move the charges in the same sense and direction as the mass of gas, resulting in an increase of electric potential through the field. The method allows collecting the charges and allows the increase in the electric potential to be available for its utilization.

The method and its apparatus may be used inverting the polarity of the bodies, which makes it feasible, to alternate voltage polarity, to produce Alternating Current (AC) instead of Direct Current (DC).

When the sense of the wind is in the same sense as the electron flux, imposed by the load (electric current through the load), the encapsulation of electrons increases the friction with other gas molecules also transported by the wind and diminishes the liberation of electrons until the clusters reach body 2, which produces an increase in the electron flux towards the load. When the wind sense is inverse to the electron flux as imposed by the load (electric current through the load), the encapsulation of the free electrons of the gas makes it more feasible for the gas to interchange positive charges with the electrons from the load. This also implies that the method and the apparatus may function with the wind in one sense or in its reverse.

Figure 2:
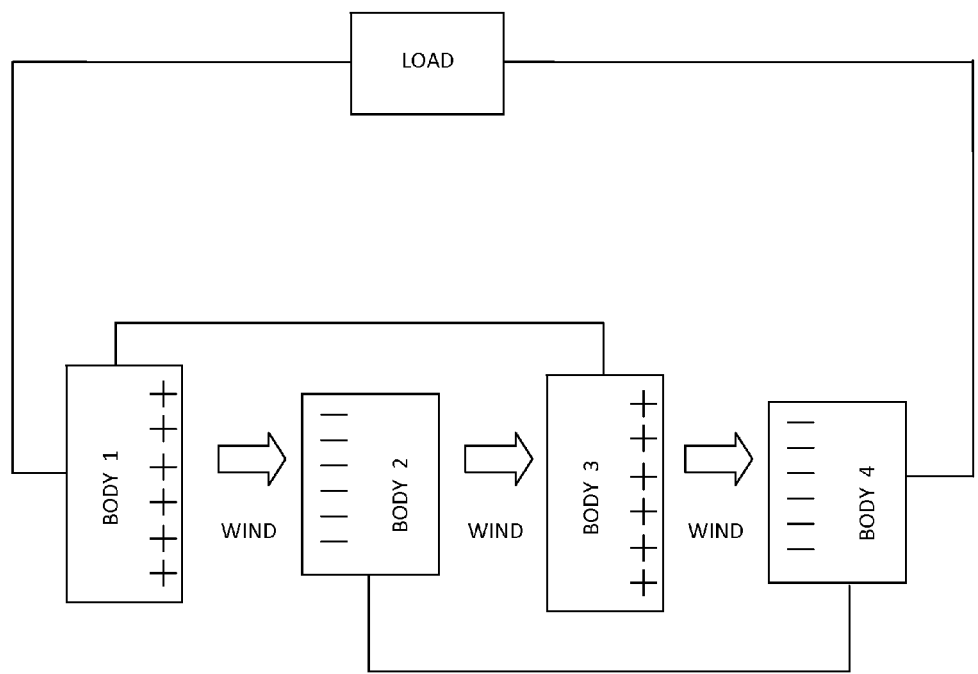
FIG. 2 is a schematic diagram of an apparatus with several units connected in series and electrically connected in parallel, to illustrate how the method functions if several units are connected in series.

In FIG. 2 we can appreciate how the system would work if we connect several bodies in series electrically connected in parallel. When the molecules of the gas used (air or other) reach a body, they exchange charges with same, in such a way that upon reaching the next body, following the direction and sense of the wind, they are again able to exchange their charges. This process may be repeated successively.

As well as with the connection explained above, the apparatus may be used with more than two bodies with a lay out to generate electric field (in accordance with the previous description of the invention), and allowing the passage of the wind among them, connected in series and/or in parallel, in order to increase the electric energy produced.

As long as the wind and humidity input are sufficient, the electric field will be maintained and even increased by the process, which determines that the said process will not consume additional external energy.

As has been mentioned previously, this method and the apparatus for its use could at first be interpreted as Electro Gas Dynamic Generators. But until current times, these latter ones have an ionization section or injection of charged particles that produce a charge cloud that will be later transported by a gas. This determines that the mobility of the particles in the method described does not increase as much as in the EGDG, resulting in that the transportation of charges in them (the latter ones) is not as efficient. The method described is different since the same does not necessarily require to generate or inject a cloud of charged particles in a specific zone, but generates the charges along the entire path taken by the gas (air or otherwise) through the system.

The humidity required in the method and the apparatus for its use, allow the transportation and the interchange of charges, making it possible to significantly increase the efficiency with respect to current Electro Gas Dynamic Generator Devices, where humidity is generally a problem, and at most use water droplets in the ionization specific zone of those devices, with the mobility disadvantages mentioned earlier. Also, water droplets greatly differ from humidity in their mass, making its transportation by means of the wind considerably more difficult.

Following, and as an example, we present a possible way of implementing the apparatus and method described which we will call method for Molecular Mill (MM). For same, we describe a possible system/apparatus, which will be called Molecular Mill (MM). Non-basic changes to it must be considered as within the scope of what will be claimed below. This is to say that the following description must be taken as illustrative and no as limiting the scope, nature or spirit of what is claimed below.

Figure 3:
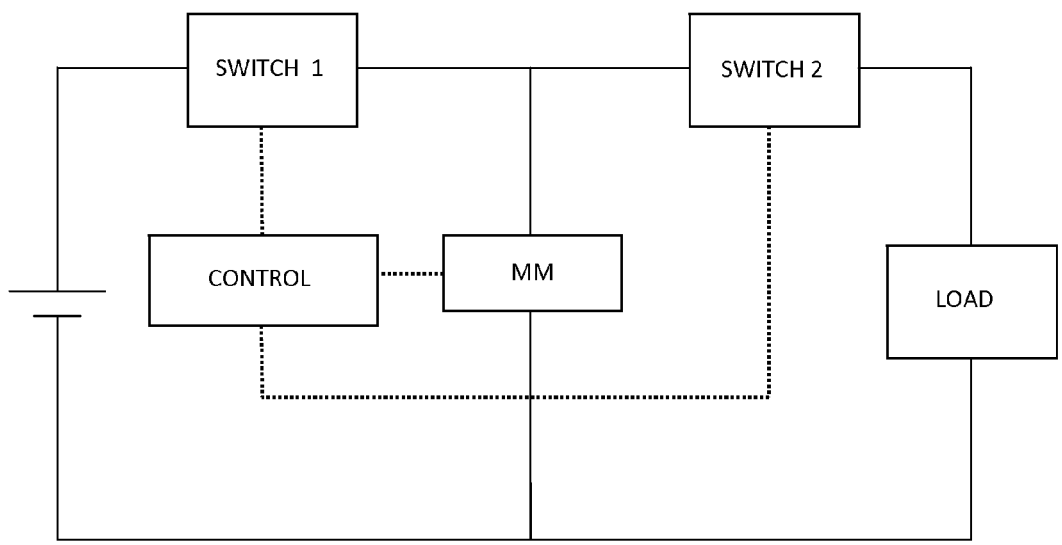
FIG. 3 is a schematic diagram which illustrates a possible implementation of the first stage of the method herewith described which consists in charging the system.

In FIG. 3 we can see a possible implementation of the first part of the method which consists in charging the MM. The dotted line represents the control line which commands switches 1 and 2. Both are commanded by the block called CONTROL in said Figure.

Initially the switches 1 and 2 are open. The block CONTROL is monitoring the passage of wind and humidity through the MM. When a certain amount of wind and humidity are detected, switch 1 is shut allowing to charge the MM. When the charge of MM gets to a threshold level (which will depend on diverse factors such as the load and the maximum current extracted from the power supply), switch 2 is shut and switch 1 is opened, passing the MM to function as a generator.

While wind and humidity are sufficient, current through the load shall be maintained. When wind and/or humidity cease to be sufficient, switch 2 is opened and the block CONTROL again monitorizes the presence of wind and humidity. The energy initially invested in creating the electric field is very low in relation to the electric energy generated in the process.

In FIG. 4 we may observe a possible implementation of the MM. Wind, on passing through the system will contribute to the electric current through the load in transporting electrons between the zones on both plates where there is no insulating material. This exchange of electrons is produced by means of the transport and exchange of positive or negative charges, which is determined by the electron flux direction which was fixed by the system on FIG. 3 (electric current through the MM). Humidity contributes in a significant way to the transport and exchange of charges by the wind.

FIG. 4 represents, as an example, an implementation of the method by means of sections at an angle, being the number of sections optional and it may be established according to the generation necessities and the characteristics of the project in which we desire to use this method. Several sections may be connected in series or in parallel, in order to constitute a MM of higher capacity so as to implement the described method.

The invention described may be used to generate electric energy from wind energy for homes, commerce and industry, both through micro and macro generation, and also for the generation of electric energy for the transportation sector, or other known uses or which may be known in the future. The method does not necessarily require the utilization of equipment with moving parts, being that apparatus of ample shape flexibility may be employed, as well as of considerably lesser size and weight with respect to conventional equipment for the same power. Likewise, this method and the apparatus for its use may function starting from wind velocities as low as approximately 5 km/h, and it could also be used in regions considered arid.

For example, the preceding arguments determine that the MM could be installed—among other uses—instead of heat exchangers as for example radiators in the automotive industry, not increasing the aerodynamic resistance of the car and being able even to fulfill both functions at the same time: to dissipate heat and to produce electric energy without unduly increasing the weight. According to experimental results obtained in the utilization of a system as described in FIG. 4, energy in the order of KWh may be obtained in this automotive use and much more in cases where energy generation is per se the goal.

In the method described, among the ions that may be generated is $H^+$[1], which implies that inside the process itself Hydrogen may be produced and it could thus be used, for example, in a fuel cell.

The examples mentioned above relating to the implementation of a Molecular Mill (MM) method, and for some of the possible examples of MM, as well as its possible uses and functions, must be understood as illustrations of possible means of implementation and use, not limiting the scope, nature or spirit of our claims. Changes that are not substantial to what has been described above and claimed below must be considered as within the scope of the invention herewith described. That means that any changes to the invention herewith described that conceptually uses the same principles of generating energy must be considered as within the scope of the invention herewith described. Even though diverse forms for the implementation for the method of a MM are described, and for that we mentioned various examples of MM systems, there could appear that, following what is herewith described, and for those having ordinary skill in the art, this may be currently known art or invented in the future, modifications or variations including substitution of functions, steps, elements of utilization that may be extrapolated to the interior or beyond what is herewith described. These variations should be considered as within the scope and spirit of this invention.

Thus, it should be understood that the forms herewith described and illustrated have been established only to the effect of describing examples and explaining the method followed. Even though the different elements in the description of this invention have been exposed in certain order and combination, it must be understood that the protection to what has been invented comprises the utilization of some of them, or part of some, of all, or of all and then some in addition. Removing part of any portion of the invention is included as within the scope of this invention.

In the same way, the words used to describe the invention should be understood not only in its habitual meaning but also in the meaning that appears from the context of the description of the invention, being it possible for same to be wider than the habitual meaning and use of the words.

Thus, if any word or sentence could be extended to include more than one meaning, then the use of the word or phrase in this application must be considered in a generic way as pertaining to all the possible meanings that emanate from the description of this invention or from the word or phrase in itself.

Besides, the invention could have other functions apart from the specific one of generating energy, so it must be understood that the protection is to the usage of the method and or the apparatus invented, being the utilization of part of them, of all of them, or of all and then some in addition.

Having declared above the general scope of the concepts and systems described, the scope of the protection must be, to what is specifically declared below, what is conceptually equivalent, what may be obviously substituted, and also what incorporates what is essential to the idea of this invention.

REFERENCES

[1] R. Messaoudi, "Influence of Humidity on Current Waveform and Light Emission of a Low-frequency Discharge Controlled by a Dielectric Barrier" IEEE Transactions on Dielectrics and Electrical Insulation Vol. 3 No. 4, August 1996.
[2] A. M. Marks, "Charged Aerosol Generator with Uni-electrode Source", U.S. Pat. No. 4,206,396 (1980).
[3] G. De Mey, "Characteristics of Electro-Gas-Dynamic wind Energy Devices, Energy Conv. & Mgmt Vol 20. pp. 201 to 203 (1980).
[4] V. A. Mohnen, "Discussion of the Formation of Major Positive and Negative Ions up to the 50 km Level", Pure and Applied Geophysics, Vol. 84, pp. 141-153, 1971.
[5] MacAlpine and Zhang et al: "Effect of Humidity on Charges/Phase-angle Patterns of ac Corona Pulses in Air" IEEE Transactions on Dielectrics and Electrical Insulation Vol. 10. No. 3; June 2003.
[6] Xingming Bian, "Negative Corona Inception Voltages in Rod-plane Gaps at Various Air Pressures and Humidities", IEEE Transactions on Dielectrics and Electrical Insulation Vol. 18. No. 2; April 2011.

We claim:

1. A molecular mill system for recovering energy contained in a moving mass of gas, comprising:
    a chamber configured to allow a flow of humid gas,
        wherein the chamber includes a bend configured to deflect the flow of humid gas;
        wherein the bend defines a first zone and a second zone;
        wherein the first zone and the second zone are separate but contiguous zones; and
        wherein the chamber is formed from two separate bodies, an upstream body and a downstream body;
    a power supply operatively connected to the upstream body and the downstream body,
        wherein the charges on the upstream body and the downstream body are equal and opposite and create an electric field; and
        wherein there is no significant divergence in electric field lines when the electric field is created;
    a circuit configured to connect the upstream body and the downstream body via a load configured to receive electricity;
    a controller configured to control the electricity delivered to the downstream body and the upstream body.

2. The molecular mill system of claim 1, wherein the gas comprises humidity.

3. The molecular mill system of claim 1, wherein polarity of the two separate bodies is reversed or inverted to produce alternating current (AC) instead of direct current (DC).

4. The molecular mill system of claim 1, wherein the gas has received contribution of charged or uncharged particles from nature.

5. The molecular mill system of claim 4, wherein the gas is passed through the chamber by wind.

6. The molecular mill system of claim 5, wherein the wind is artificially produced.

7. The molecular mill system of claim 1, wherein the first zone is an ionization zone and the second zone is a collection zone.

8. The molecular mill system of claim 7, wherein a portion of one of the separate bodies has a dielectric insulator positioned thereon,
- wherein the dielectric insulator inhibits the recombination of charges within the corresponding zone, and
- wherein the dielectric insulator enables the generated charge to be collected in the collection zone.

9. The molecular mill system of claim 1, wherein the chamber allows transportation and exchange of charges between the two separate bodies and the gas, and
- wherein the electric field is below the dielectric rupture threshold of the gas.

10. The molecular mill system of claim 1, wherein the gas is air.

11. The molecular mill system of claim 1, further comprising one or more additional bodies positioned to allow the passage of the gas among the separate bodies in order to increase the amount of electricity produced.

12. The molecular mill system of claim 1, wherein the gas passes through the chamber at a rate of at least 1 meter per second.

\* \* \* \* \*